3,413,173
UPPER WELDING AND CUTTING MACHINES
Frank C. Long, Quorn, England, assignor to United Shoe Machinery Corporation, Flemington, N.J., a corporation of New Jersey
Filed Aug. 24, 1965, Ser. No. 482,197
Claims priority, application Great Britain, Sept. 1, 1964, 35,663/64
6 Claims. (Cl. 156—380)

This invention is directed generally to improvements in presses and more particularly to presses for performing cutting and/or welding operations on shoe parts. The term shoe where used herein is used generically as indicating outer footwear generally.

In the shoe manufacturing trade it is known to form trims, such for example as bows, from two or more layers of material by the use of a press having a presser member movable towards and away from the material on a work support, and means for establishing a high frequency electric field between the work support and a knife which is pressed against the material by the presser member. If the layers of material are of thermoplastic substances, then if a cutting edge portion of the knife is pressed against the layers while the high frequency field is established, the layers may be welded together. A foam material may be sandwiched between two outer layers in this operation so that a trim may be produced in which edges of the outer layers are welded together while the major portion of the trim is of a thickness determined by the thickness of the foam material.

If any of the layers of material is of leather or the like, it may be coated with adhesive prior to presentation to the machine, and the high frequency electric field then employed to activate the cement during operation of the machine, while pressure exerted by the presser member is utilized to press the layers together to assist cementing together of the parts.

Decoration of shoe parts may also be achieved by "applique" or "tear seal" techniques in which two or more layers of material are placed on the work support and the cutting edge portion of the knife pressed against the uppermost layer of material. The cutting edge portion of the knife is caused to penetrate through or nearly through the uppermost layer of material and the operation of the high frequency field is so arranged that material adjacent the cutting edge portion of the knife may be welded to the underlying layer of material along the line of the cutting edge, and portions of the uppermost layer adjacent the weld are so weakened that surplus material may be eased away from the material welded to the underlying layer. In this way various types of pattern may be formed on shoe parts.

An object of the present invention is to provide a machine for efficiently performing either one of the types of operation described above either alone or in combination with the other.

Other objects are to improve the overall speed of performing welding and cutting operations and to improve the uniformity of the welded product.

The invention is illustrated as embodied in a press intended for performing a cutting and welding operation simultaneously with an applique operation. There is mounted on the presser member of the press according to a feature of the invention, a knife consisting of two parts, one for cutting and welding and the other for welding only. Similarly the presser member consists of two parts each carrying one part of the knife and the two parts of the presser member are arranged to move together to a welding position under the action of a pneumatically operated piston. The welding position is variable to suit the work piece by means of an accurately adjustable abutment so that edge portions of both parts of the knife will press into the uppermost layer of the work piece. A high frequency electric field is established in response to the supply of air underpressure to the piston so that as the knife engages the work piece a high frequency electric field is established between the knife and the work support. The knife is maintained in welding position for a predetermined period of time depending on the nature, thickness and other factors relating to the work piece so that the uppermost layer becomes welded to the layer immediately below and the uppermost layer is so weakened at the edge that surplus material may be torn away with ease. At the end of the predetermined welding period the high frequency current is cut off and the second part of the presser member is operated to press a cutting edge portion of the cutting and welding portion of the knife entirely through the material.

In order that the above and other features of the invention may be more clearly understood there will now be given a detailed description, with reference to the accompanying drawings, of the illustrative machine above referred to. It is to be understood however that the illustrative machine is selected for description merely by way of exemplification of the invention and not by way of limitation thereof.

Figure 1:
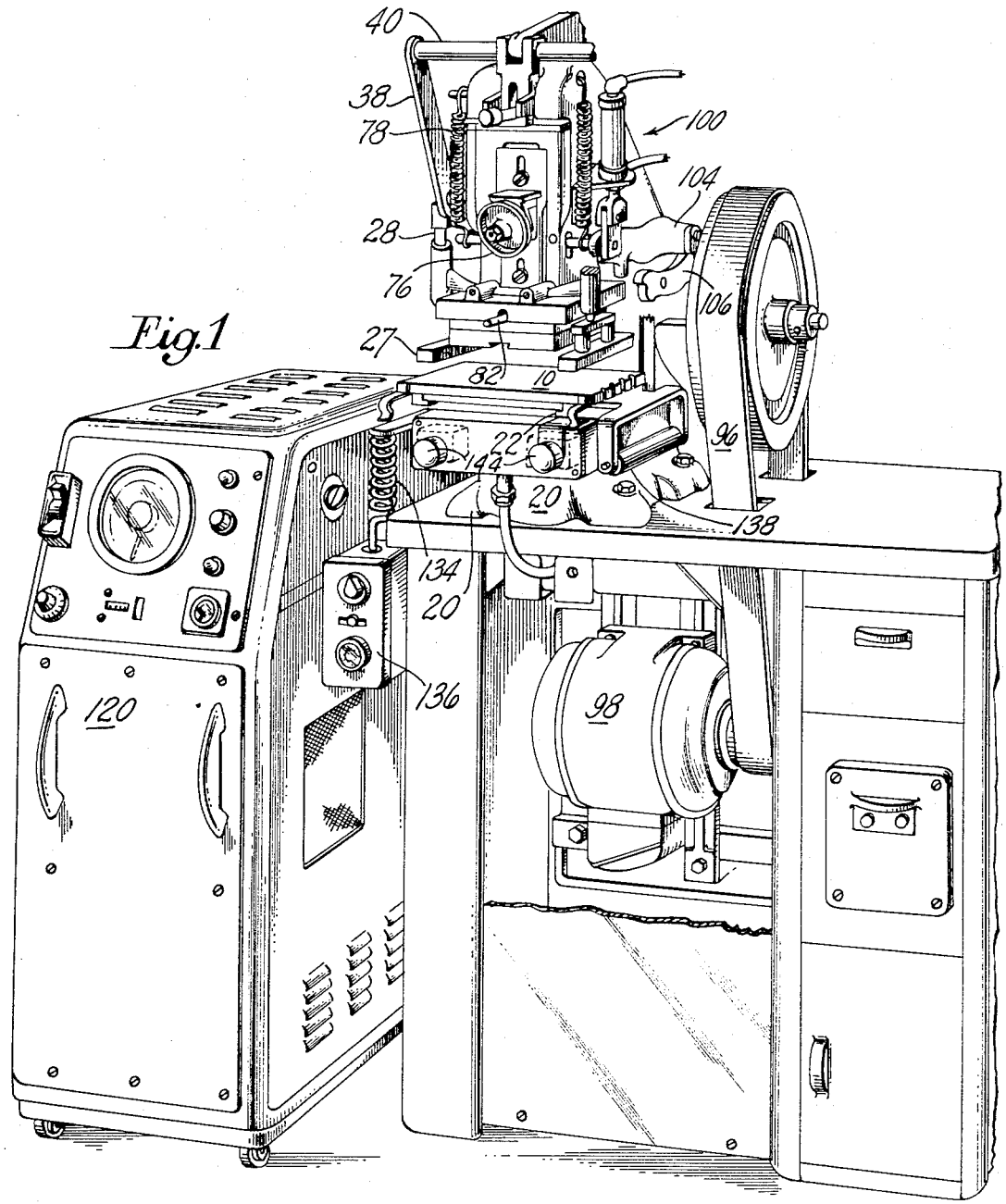
FIG. 1 is a general view of the front of the illustrative machine.
Figure 2:
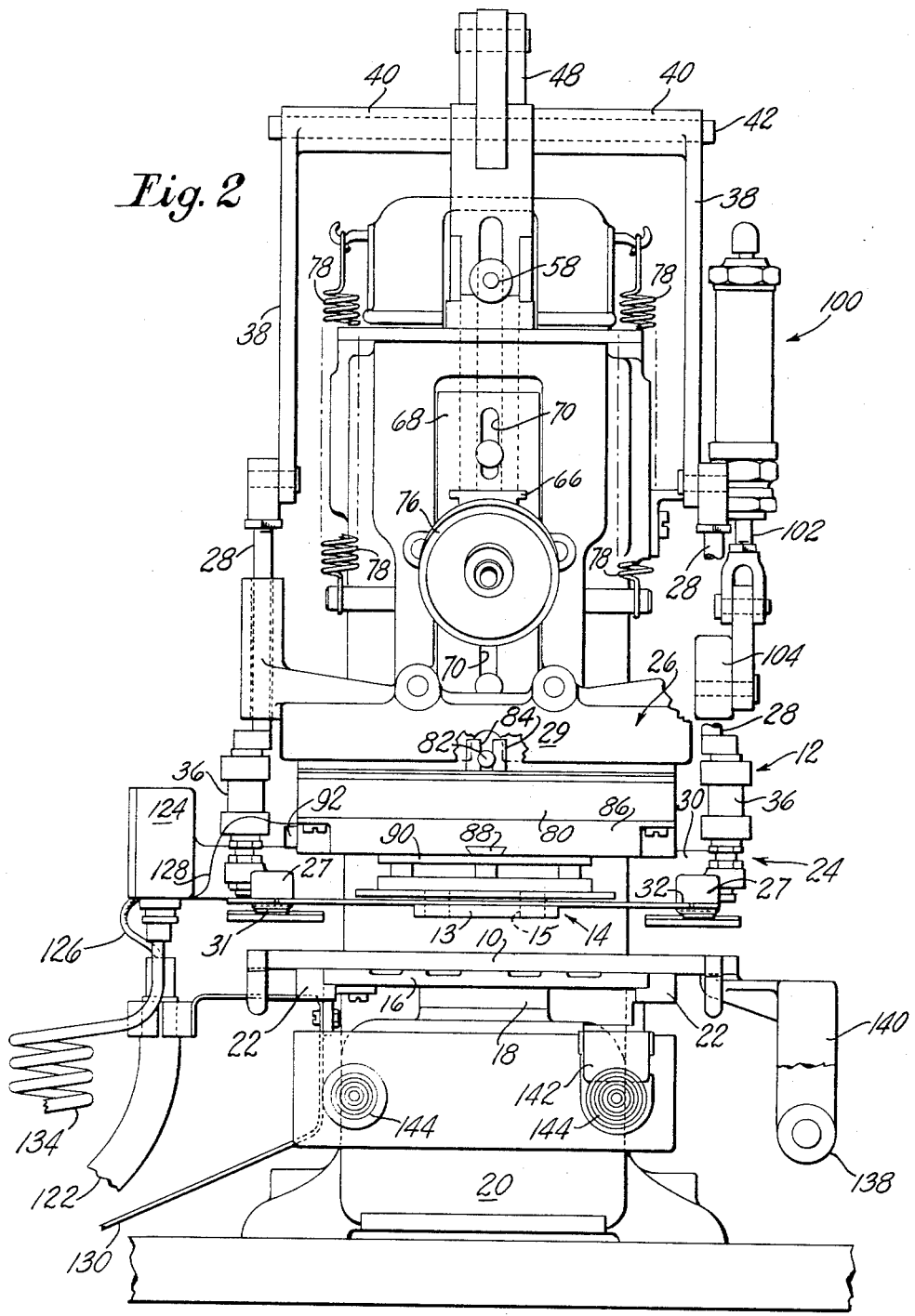
FIG. 2 is a front view of an upper portion of the machine.

The illustrative machine is a cutting press suitable for use of performing cutting and welding operations on shoe parts and comprises a work support 10 on which a work piece consisting of two or more layers of material may be supported, and a multi-part presser member 12 on which a knife 14 is mounted. The work support 10 is slidably mounted on a plate 16 supported on a pillar 18 upstanding from a portion of a frame 20 of the machine, the work support having guideways 22 depending from an undersurface thereof which are adapted to receive edge portions of the plate 16. The work support is thus mounted for movement into and out of the machine.

Figure 3:
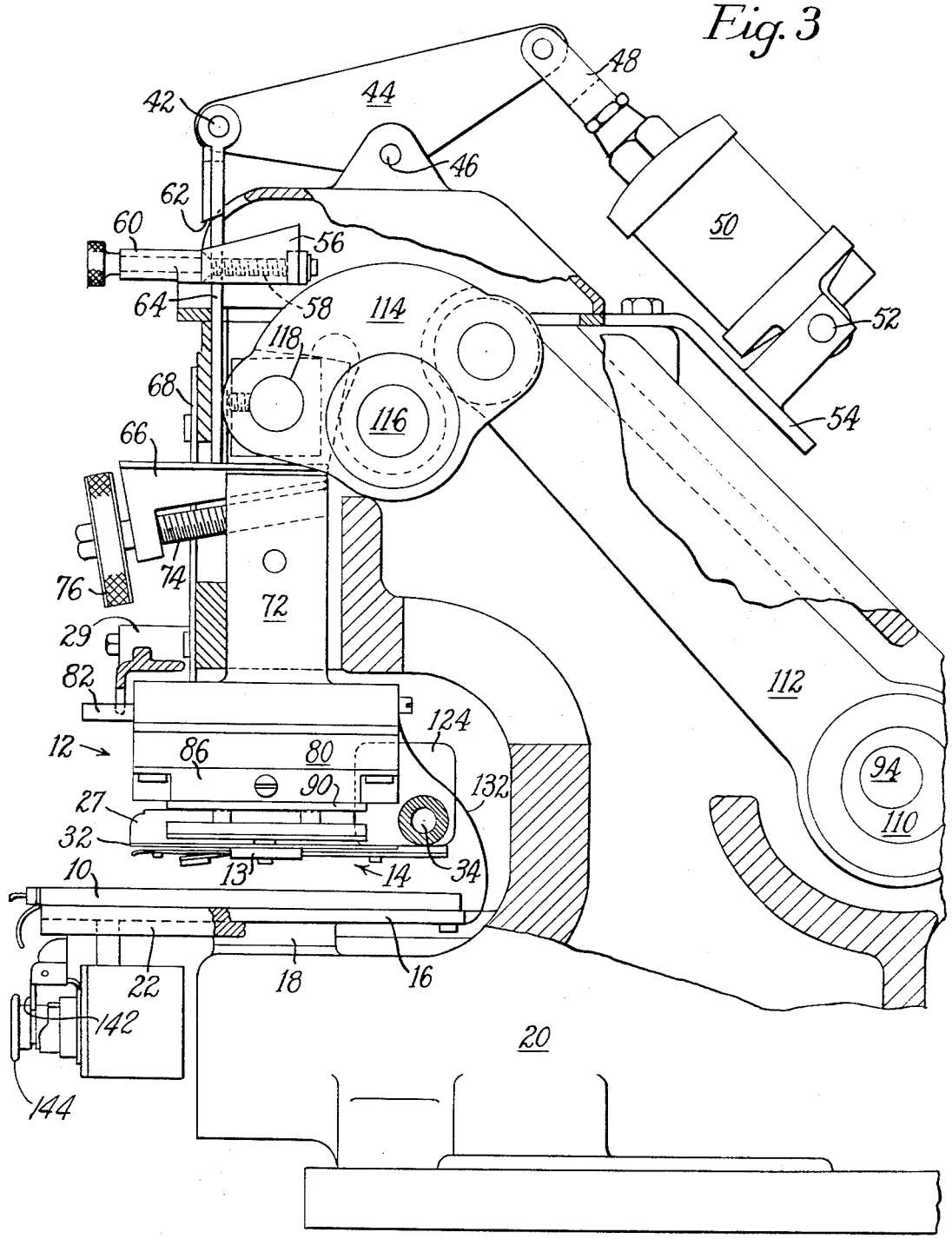
FIG. 3 is a right-hand side view of the upper portion of the machine, some parts being shown in section and others broken away.

The multi-part presser member consists of an outer part 24 and an inner part 26. The outer part 24 of the presser member is connected by means of insulators 36 to lower end portions of a pair of rods 28, one at either side of the machine, and comprises a pair of forwardly and rearwardly extending metallic arms 27 rearward portions of which are interconnected by means of a heater housing 30. Lower portions of the arms 27 are provided with springy brass strips 31 screwed to the arms and adapted to clip edge portions of a brass plate 32 against the arms, there being a welding part 13 of the knife 14 attached to the brass plate. Thus the welding portion of the knife may be heated, by conduction, by means of an electric heater 34 contained within the housing 30 (FIG. 3). The rods 28 extend upwardly through bearing portions of a casting 29 secured to the frame 20 and upper end portions of the rods 28 are connected to links 38 which are provided with transversely extending sleeves 40. A rod 42 is arranged to extend through the sleeves 40 and through a bore in a lever 44 which is pivotally mounted on the frame 20 by means of a stud 46. A rearward end portion of the lever is pivotally connected to a bifurcated end portion of a piston 48 of a pneumatically operated piston and cylinder device, a cylinder 50 of which is pivotally mounted at 52 on a bracket 54 bolted to the frame 20. Operation of the piston and cylinder arrangement thus moves the outer part 24 of the presser member heightwise in the machine.

Downward movement of the outer part 24 is limited by an adjustable abutment provided by a pair of upstanding wedge shaped plates 56 interconnected by a rib portion mounted on a screw 58. The screw 58 is retained within a lug 60 on the frame 20 and is threadedly received within the rib portion. Rotation of the screw moves the plates 56 into and out of the machine to bring appropriate parts thereof below co-operating portions 62 of a bar 64 inclined at a similar angle to upper faces of the wedge shaped plates 56. The bar 64 is pivotally mounted on the rod 42 and extends downwardly through a slot in the casting as far as an upper surface of a stop provided with a wedge shaped member 66.

The wedge shaped member 66 is of generally T shaped cross section and extends through a plate 68 which is mounted for heightwise movement on the frame 20, there being heightwise extending slots 70 provided in the plate and screws extending therethrough and threaded into the frame 20. Widthwise extending limbs of the member 66 are received within slots in the plate 68 and a wedge shaped heightwise extending portion is received within the plate and within a slot in a block 72. An upper face of the slot in the block 72 is inclined at a similar angle to the lower surface of the wedge shaped member 66. A threaded rod 74 is threaded into a depending flange portion of the member 66 and is received within the block 72. A handwheel 76 is keyed onto an outer end portion of the rod 74 and by rotating the handwheel the wedge shaped member may be moved into or out of the machine thus to set the initial heightwise position of the block 72 which is urged upwardly against the member 66 by means of springs 78 connected between the frame and an outwardly extending portion of the block. A block 80 of insulating material is attached to a lower surface of the block 72 by means of a pin 82 which extends within the block 72 and into a recess in which a pair of upstanding pegs 84 formed on an upper surface of the block 80 are received. The pegs 84 are spaced apart by an amount less than the diameter of the pin 82 and are provided with recesses on opposed surfaces adapted to receive the pin 82 so that the insulating block may be secured to the block 72. A metal plate 86 is secured, by screws of insulating material, beneath the block 80 and is provided with a dovetail slot adapted to receive a dovetail portion 88 of a plate 90 adapted to carry a cutting and welding part 15 of the knife 14. The plate 90 is secured to the plate 86 by a transversely extending rod 92 which extends through a bore in the plate 86.

It will be apparent that through the train of connections just above described, when the piston and cylinder 48, 50 are operated, the outer part of the presser member is moved towards the work support by a predetermined extent as regulated by the plates 56, and the bar 64 is moved into engagement with the wedge shaped member 66. The amount of movement of the bar before it engages the wedge shaped member is regulated by the setting of the handwheel 76, and when the lower edge portions of the cutting and welding part 15 and the welding part 13 of the knife 14 are substantially level, the setting of the handwheel is generally such that both parts of the presser member are moved towards the work support to the same extent. In this way the entire lower surface of the knife 14 may be brought into contact with an upper surface of a workpiece supported on the work support 10.

Figure 4:
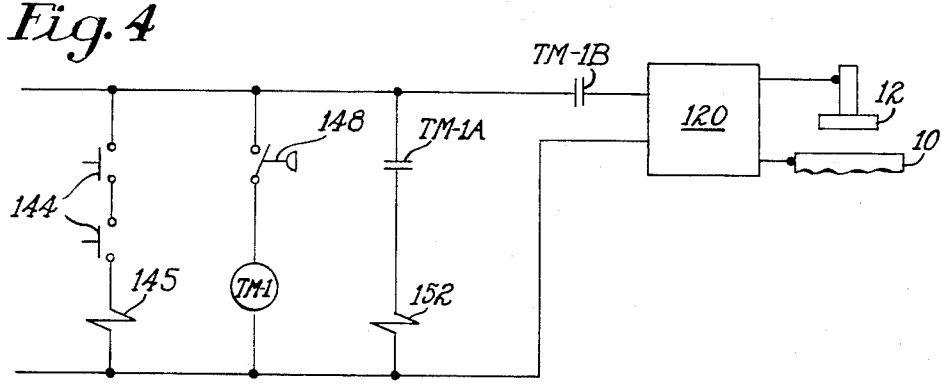
FIG. 4 is a wiring diagram.
Figure 5:
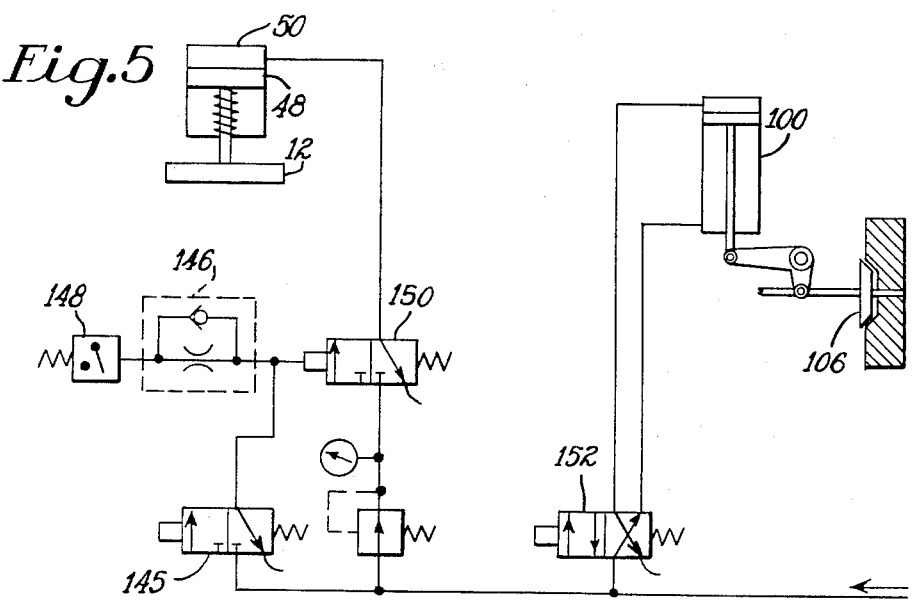
FIG. 5 is a diagram of pneumatic connections of the machine.

In order that a cutting edge portion of and welding part 15 of the knife may be pressed entirely through the workpiece, means is provided in the form of an adjustable timing switch TM–1 (FIG. 4) arranged to operate by closing normally open montacts TM–1A a predetermined time after downward movement of the two parts of the presser member to move the inner part 26 thereof downward independently of the outer part. At the right-hand side of the machine a shaft 94 is driven by a belt 96 from an electric motor 98. A pneumatically operated piston and cylinder device 100 mounted on the side of the frame 20 is arranged to be operated, as will be explained below, at the end of a welding operation so that a piston 102 thereof swings a lever 104 to operate a clutch mechanism 106. Operation of the clutch mechanism imparts rotational motion to the shaft 94 to rotate an eccentric 110. A link 112 has a lower end portion which surrounds the eccentric 110, and an upper end portion which is pivotally connected with a curved lever 114. The lever 114 is pivotally mounted on the frame 20 by means of a stud 116 and carries on a forward portion a block 118. The block 118 is positioned above the block 72 and when in inoperative position is spaced apart therefrom as shown in FIG. 3. Rotation of the eccentric 110 brings about movement of the link 112 so as to swing the lever 114 in a counterclockwise direction, as viewed in FIG. 3, about the stud 116, and rapidly moves the block into engagement with the wedge shaped member 66. In this way the inner part of the presser member is moved downwardly independently of the outer part, which is restrained against further movement by the abutment plates 56, and the cutting edge portion of the cutting and welding part 15 of the knife is punched entirely through the workpiece.

Means is provided for establishing a high frequency electric field between the work support and the knife, there being a high frequency generating unit 120 (FIG. 1) situated at the left-hand side of the machine. The unit is connected by way of a coaxial cable 122 with a portion 124 of the heater housing 30 which extends outwardly at the left-hand side of the presser member, a copper strip 126 being connected between a central, conducting, portion of the cable and the portion 124. Also, the portion 124 is connected with the plate 86 by means of a further copper strip 128. High frequency electric current may thus be supplied to the whole of the knife. A copper plate 130 is screwed to a left-hand side portion of the plate 16 and to a container for the high frequency generating unit 120. The block 72 and the plate 16 are interconnected by a further copper strip 132. The portion 124 is connected, by means of a coil of copper sheathed cable 134 which provides a choke, with a heater control 136 which is also grounded.

In operation of the illustrative machine an operator first switches on the heater control 136 and sets it so that the heater 34 heats the knife carrying plate 32 by conduction to a required temperature. The operator then sets the high frequency generating unit so that it may subsequently establish a high frequency electric field of desired intensity between the knife and the work support for a predetermined time. Having set the machine for operation the operator places a workpiece consisting of two or more layers of thermoplastic material on the work support in a desired position, a sheet of insulating board being placed between the workpiece and the work support. A supply roll of insulating board is carried on a roll 138 rotatably mounted between arms 140 depending from the work support 10. The work support is then pushed into the machine beneath the presser member until a locking plate 142 releases one of a pair of buttons 144 for operation. The locking plate is generally L shaped in cross section and is pivoted on the plate 16 in such a manner that when the work support is not in operative position, the work support engages an upstanding lug thereon to hold a heightwise extending limb thereof against a rearward surface of the button 144 so as to guard against depression thereof. The two buttons 144 are connected in series and in this way the machine is organized so that the machine may only operate when the work support is in operative position.

When the locked one of the buttons has been released, the buttons 144 are depressed to initiate a cycle of operations of the machine in which relative movement is brought about between the whole of the presser member and the work support, to a predetermined extent, so as to press the knife into engagement with at least the uppermost layer of the workpiece, and subsequently after a predetermined time further relative movement is brought about between one part only of the presser member and the work support to press a cutting edge portion of the knife through the workpiece. Depression of the buttons 144 brings about operation of a solenoid valve 145 to allow passage of air under pressure to a flow control valve 146, a pressure switch 148 and a pneumatically operated valve 150. Operation of the valve 150 permits passage of air underpressure to the cylinder 50 so that the whole of the presser member is moved downward, to an extent limited by the plates 56 and the portions 62 to press the knife into engagement with the workpiece. The flow control valve and the pressure switch are so arranged that when the knife engages the workpiece, the pressure switch is operated to start the timing switch TM–1 (FIG. 4) which in addition to the contacts TM–1A is also provided with a pair of normally open contacts TM–1B connected to initiate operation of the high frequency generating unit. A high frequency electric field is thus established and is allowed to exist at the desired intensity for the predetermined time until the contacts TM–1B open.

The positions of the plates 56 are so set by means of the screw 58 that during this part of the operation edge portions of at least the welding part 13 of the knife are pressed at least substantially through one or more layers of the workpiece and approach the next lower layer. The high frequency electric field has the effect of welding the layer or layers which have been penetrated to the next lower layer, and also of weakening the material adjacent the weld so that surplus material may subsequently be torn away. Thus upstanding pattern pieces are welded onto the lower layer of material. When this welding has taken place and the predetermined time has elapsed, the high frequency electric current is automatically switched off by the opening of the contacts TM–1B and a further solenoid valve 152 is actuated by closing of the contacts TM–1A.

Actuation of the solenoid valve 152 permits supply of air underpressure to the cylinder of the piston and cylinder device 100 to cause the clutch mechanism 106 to be operated. As hereinbefore described the operation of the clutch mechanism causes the inner part 26 of the presser member to be moved independently of the outer part 24 to press a cutting edge portion of the cutting and welding portion of the knife entirely through the workpiece, the outer part of the presser member being restrained against further downward movement.

At the completion of a cycle of operation the contacts TM–1A reopen and the piston 48 is returned to its initial position within the cylinder 50 by means of a spring therein, thus allowing the presser member to return to its inoperative position. The work support may then be drawn out of the machine and the workpiece removed therefrom. Surplus material is removed and a further workpiece placed on the work support ready for a subsequent operation.

In the illustrative machine, the part 15 of the knife is shown as being within the part 13, but it will be apparent that the positions could be reversed, or various other arrangements used according to the product desired. In addition, it will be understood that either one of the parts 13 and 15 may be used alone if desired.

Having thus described my invention what I claim as new and desire to secure by Petters Patent of the United States is:

1. A press for operating upon a multi-layer workpiece comprising a work support, first and second pressers, a knife mounted on each presser, means for moving the pressers toward the work support so as to press the knives into engagement with the uppermost layer of the workpiece, means for establishing a high frequency electric field between the work support and the knives and means for bringing about movement of one of the pressers after the high frequency electric field has been established for a predetermined time to press a cutting edge portion of one of the knives entirely through the workpiece.

2. A press for operating upon a multi-layer workpiece comprising a work support, a multi-part presser member, a knife mounted on the presser member, means for establishing a high frequency electric field between the work support and the knife, means for heating the knife, means for moving the presser member toward the work support to press the knife into engagement with the uppermost layer of the workpiece when the high frequency field is established and means for causing further relative movement between a part of the presser member and the work support after the high frequency field has been established for a predetermined time to press a cutting edge portion of the knife entirely through the workpiece.

3. A press for operating upon a multi-part workpiece comprising a work support, multi-part presser members adapted to support a knife having a welding portion and a cutting and welding portion, means for establishing a high frequency electric field between the work support and the knife, means for moving the presser member toward a welding position above the work support to press the whole knife into engagement with the uppermost layer of the workpiece, means for arresting movement of the presser at the welding position and means actuated after a predetermined welding period for moving a cutting edge of the cutting and welding portion of the knife entirely through the workpiece.

4. A press for operating upon a multi-layer workpiece comprising a work support, multi-part presser members adapted to support a knife having a welding portion and a cutting and welding portion, air operated means for moving the presser member toward a welding position above the work support to press the whole knife into engagement with the uppermost layer of the workpiece, means for establishing a high frequency electric field between the work support and the knife in response to the flow of air to the air operated means, means for arresting movement of the presser at the welding position and means actuated after a predetermined welding period for moving a cutting edge of the cutting and welding portion of the knife entirely through the workpiece.

5. A press for operating upon a multi-layer workpiece comprising a work support, multi-part presser members adapted to support a knife having a welding portion and a cutting and welding portion, air operated means for moving the presser member toward a welding position above the work support to press the whole knife into engagement with the uppermost layer of the workpiece, means for establishing a high frequency electric field between the work support and the knife in response to the flow of air to the air operated means, means for arresting movement of the presser at the welding position, means actuated after a predetermined welding period for turning off the supply of high frequency electric energy and means also actuated at the end of the welding period for moving a cutting edge of the cutting and welding portion of the knife entirely through the workpiece.

6. A press for operating upon a multi-layer workpiece comprising a work support, a two part presser adapted to support a knife having a welding portion and a cutting and welding portion, means for establishing a high frequency electric field between the work support and the knife, an air cylinder, a piston in the cylinder and coupled directly to the first part of the presser, an adjustable connection between the piston and the second part of the presser for moving it part way with the first toward the work support to bring the whole knife to a welding position, means for arresting movement of the presser at the welding position and means actuated after a predetermined welding period for moving the second part of the presser independently of the first to drive a cutting edge of the cutting and welding portion of the knife entirely through the workpiece.

No references cited.

DOUGLAS J. DRUMMOND, *Primary Examiner.*